United States Patent [19]
Fujimoto et al.

[11] Patent Number: 5,694,527
[45] Date of Patent: Dec. 2, 1997

[54] IMAGE FORMING APPARATUS WHICH PROCESSES INPUT DATA BASED UPON PARAMETER DATA REPRESENTATIVE OF A CHARACTERISTIC OF IMAGE PROCESSING DATA

[75] Inventors: Masaya Fujimoto; Haruo Yamamoto, both of Osaka, Japan

[73] Assignee: Mita Industrial Co., Ltd., Osaka, Japan

[21] Appl. No.: 383,434

[22] Filed: Feb. 3, 1995

[30] Foreign Application Priority Data

Feb. 9, 1994 [JP] Japan .................. 6-015233

[51] Int. Cl.$^6$ .................. H04N 1/405
[52] U.S. Cl. .................. 395/109; 358/440; 358/456
[58] Field of Search .................. 358/456, 457, 358/298, 404, 444; 395/164–166, 109, 114; H04N 1/405

[56] References Cited

U.S. PATENT DOCUMENTS

| | | |
|---|---|---|
| 4,499,489 | 2/1985 | Gall et al. .................. 358/75 |
| 4,533,941 | 8/1985 | Keane et al. .................. 358/75 |
| 4,926,251 | 5/1990 | Sekizawa et al. . |
| 5,282,059 | 1/1994 | Fukushima et al. .................. 358/456 |
| 5,361,329 | 11/1994 | Morita et al. . |
| 5,412,488 | 5/1995 | Ogata .................. 358/455 |
| 5,465,160 | 11/1995 | Kamo et al. .................. 358/450 |
| 5,557,709 | 9/1996 | Shu . |

FOREIGN PATENT DOCUMENTS

| | | |
|---|---|---|
| 0293214 | 11/1988 | European Pat. Off. . |
| 2174265 | 10/1986 | United Kingdom . |

*Primary Examiner*—Kim Vu
*Attorney, Agent, or Firm*—Beveridge, DeGrandi, Weilacher & Young LLP

[57] ABSTRACT

An image forming apparatus is provided with the following: rewritable RAM which outputs as output image data, data at an address corresponding to an input image data; a ROM in which a data to be written in the RAM is stored; a data processing CPU capable of processing and changing the data to be written in the RAM before the data are written; and a RAM. The ROM also stores parameter data representative of the characteristic of the data stored therein. The CPU and the RAM process the data to be written in the RAM with reference to the parameter data.

5 Claims, 5 Drawing Sheets

IMAGE FORMING APPARATUS WHICH PROCESSES INPUT DATA BASED UPON PARAMETER DATA REPRESENTATIVE OF A CHARACTERISTIC OF IMAGE PROCESSING DATA

BACKGROUND OF THE INVENTION

1. Field of the Invention

The present invention relates to an image forming apparatus such as an electrographic copying machine.

2. Description of the Prior Art

In an electrographic copying machine, if an image data of an original read out by a scanner is printed out without being processed, no correct image is obtained. This is because of a characteristic of the scanner, a light quantity difference between information on the three primary colors of light and colors reproduced by toner and a gap between the tone of the input image data and the reproduction characteristic of the toner. Therefore, various processings are performed on the image data before it is printed out. Image processing data used for the processings are stored in a read only memory (hereinafter, referred to as "data ROM"), and read out, when necessary, to be used for the processings of the input image data. Table 1 shows a mapping of a data ROM in a conventional copying machine.

Since the data used for image processing usually have many characteristics, it is desirable to perform an adjustment and processing in accordance with the characteristics. However, since no data representative of the characteristics are stored in the data ROM, the conventional copying machine conjectures the characteristics on a computer program to obtain the characteristics. The adjustments and processings are performed based on the characteristics. For example, an output half tone processor which performs a half tone processing on the input image data sets a data (threshold value) of a random access memory (RAM) of the output half tone processor by reading-out the data from the data ROM. When the copying machine is of a characteristic such that the image output tends to be insufficient in high density portions and too large in low density portions as shown in FIG. 5, the threshold value of the RAM is necessarily corrected in view of the characteristic.

In this case, to increase the density at a portion where the tone of the input data is high, since the tone of the input data corresponds to the address of the data ROM, for an input data of 250 tones, it is suitable to use the value at the address 260 which is 250+10. However, since the ROM only has the data of addresses 0 to 255, it is necessary to perform a calculation to obtain the data corresponding to the address 260. In that case, information such as the way of increase of the data (threshold value) of the ROM is necessary, and the information is obtained by conjecture. Specifically, the data (threshold value) of the address 260 is calculated by conjecturing the way of increase of the matrix of the data (matrix order, pixel order, cross order, etc.), the order of increase of the matrix of the pixels and the like from the data (threshold values) stored, for example, at the addresses 252, 253, 254 and 255 of the existing addresses of the ROM.

However, there may be an error in the conjecture. In addition, a program is necessary for the conjecture and the processing requires time. In some machines, comprehensive adjustments and processings for all the characteristics are performed without performing any conjecture. However, such adjustments and processings are not optimal for the image data, so that high performance and high accuracy are not obtained as a result of the image processing.

SUMMARY OF THE INVENTION

An object of the present invention is to provide an image forming apparatus capable of a highly accurate image formation processing in view of the characteristics of the image processing data.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
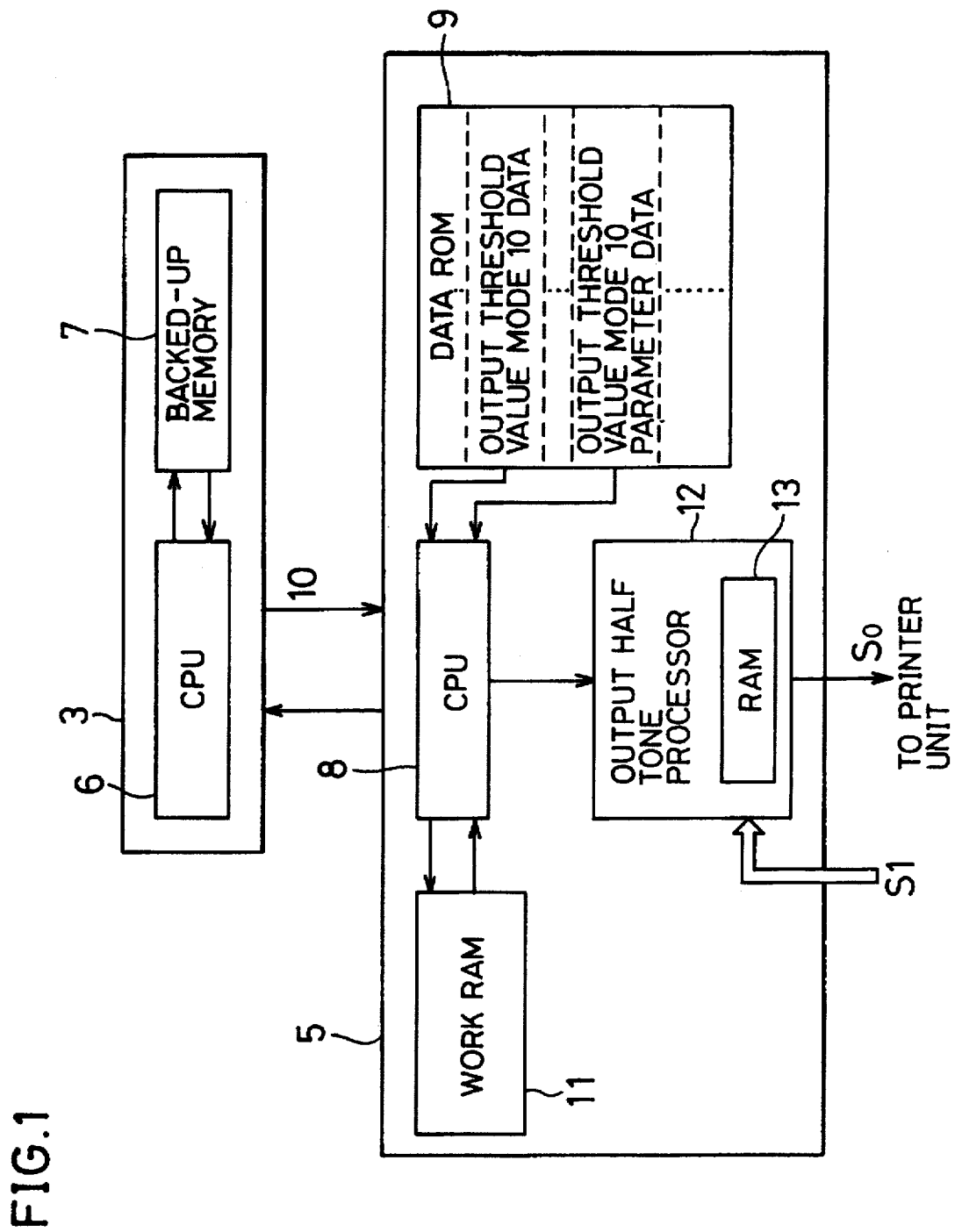
FIG. 1 is a block diagram of a relevant portion of a digital electrographic copying machine embodying the present invention.
Figure 2:
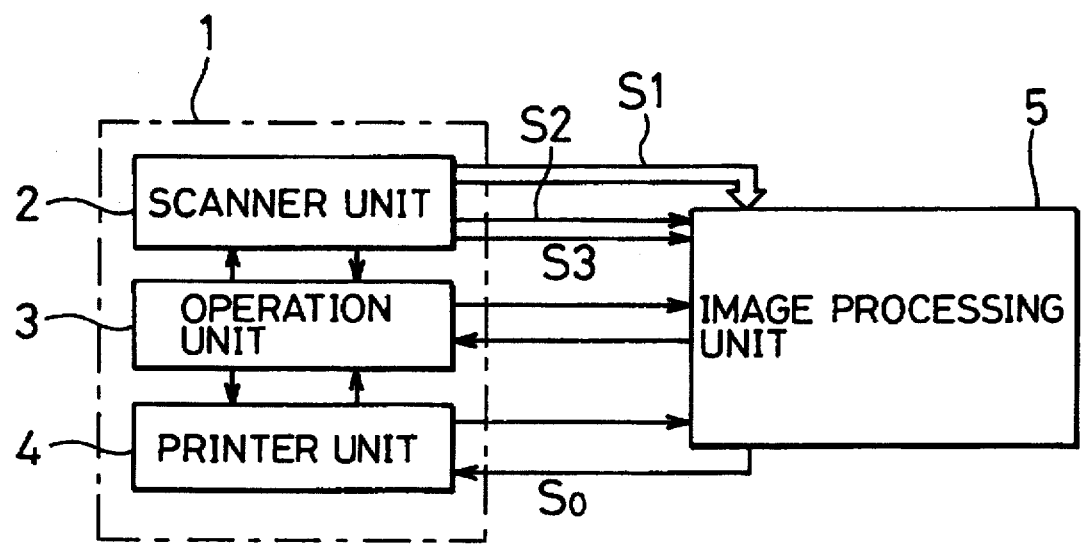
FIG. 2 is a block diagram showing the general arrangement of the electrographic copying machine.

FIG. 1 shows the details of an operation unit 3 and an image processing unit 5 in the block diagram of a digital electrographic copying machine of FIG. 2. Referring to FIG. 2, reference numeral 1 represents a copying machine, reference numeral 2 represents a scanner unit, and reference numeral 4 represents a printer unit. The scanner unit 2 reads out an original image and supplies its image data S1 to the image processing unit 5. The scanner unit 2 also outputs a horizontal synchronizing signal S2 (synchronizing signal in the main scanning direction) and a vertical synchronizing signal S3 (synchronizing signal in the sub scanning direction) which are transmitted to the image processing unit 5.

The operation unit 3 supplies various image processing data (image mode data, fine adjustment data, etc.) to the image processing unit 5. The image processing unit 5 performs various adjustments and processings on the input image data S1 and transmits the processed data to the printer unit 4. The image processing unit 5 is formed on one circuit board and incorporated in the copying machine 1.

Referring to FIG. 1, the operation unit 3 includes a central processing unit (CPU) 6 and a backed-up memory 7. While the backed-up memory 7 is a static random access memory (SRAM) backed up by a back up power source, an electrically erasable programmable read only memory (EEPROM) may be used instead of the SRAM. In the backed-up memory 7, the initial values of the copying machine and the image processing data are stored. With respect to the image quality mode, the mode numbers of modes such as the character mode and the photo mode are provided. The subsequently-described photo mode is stored as a data named mode 10.

Figure 5:
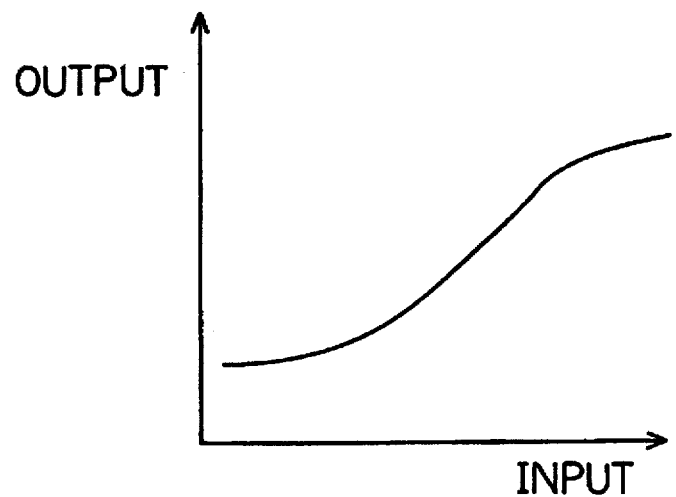
FIG. 5 shows an example of an input/output characteristic of the electrographic copying machine.

When the input and output characteristic of the copying machine is such that the image output tends to be insufficient in high density portions and too large in low density portions as shown in FIG. 5, a data representative of the characteristic is also stored. A part of the data stored in the backed-up memory 7 are transferred to the image processing unit 5 when the power is activated. The remaining data such as the image quality mode is transferred when the mode selecting operation is performed by operating a key prior to the copying.

The image processing unit 5 includes a CPU 8, a data ROM 9, a work RAM 11 and an output half tone processor 12. The output half tone processor 12 includes a RAM 13. The mapping of the data ROM 9 is as shown in Table 2. This mapping is different from that of the prior art of Table 1 in that an output threshold value parameter storing area 20 is provided for storing output threshold value parameters. The output threshold value parameters represent the characteristic with respect to the output threshold value data (stored in an area 21 below the output threshold value parameter).

The mapping in the output threshold value area 21 is as shown in FIG. Table 3. The numerals lined on the left of a frame 15 and the numerals lined above the frame 15 are address data. In the case of the photo mode, a data file mod10 (ht-md10) at an address (02000H, 800H) is specified. Table 4 shows the mapping in the output threshold value data parameter area 20. The numerals on the left and above a frame 16 are address data. The parameter relating to the data on the photo mode is stored in a file mod10 (ht-md10) at an address (00080H, 20H).

Figure 4A:
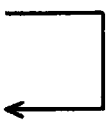
FIGS. 4A to 4D show the order of increase of the output threshold value data.
Figure 4B:
Figure 4C:
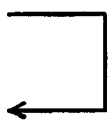
Figure 4D:
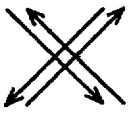

Table 5 shows the details of the parameter data of the output threshold value data. The bottom row (00H) shows data representative of the way of increase of the matrix. When the matrix is increased in the matrix order as shown in FIG. 4C, a flag 0 is set. When the matrix is increased in the pixel order as shown in FIGS. 4A and 4B, a flag 1 is set. When the matrix is increased in the cross order as shown in FIG. 4D, a flag 3 is set. The second row from the bottom (i.e. 01H) shows the matrix size of a 1×2 or 2×2 dither matrix. This data consists of 8 bits. Of the 8 bits, 0 to 3 bits represent the vertical size and 4 to 7 bits represent the horizontal size.

In the 2×2 matrices (multi-value dither matrix) shown in FIGS. 4A to 4D, in the matrix of FIG. 4A, the matrix increases clockwise with respect to four pixels. In the matrix of FIG. 4B, the matrix increases in the order of the first line, the second line. In the matrix of FIG. 4C, the matrix increases clockwise but in the subdivided units unlike the matrix of FIG. 4A.

Specifically, when the tone number of the input image data is for example 150, in the matrix of FIG. 4A, the matrix ends with the first pixel on the upper left and the second pixel on the upper right being all filled up and with 150-127=23 tones of the third pixel on the lower right being filled up, whereas in the matrix of FIG. 4C, the pixels are filled up in the order of (1), (2), (3) in the subdivided units, so that blank portions are left in each pixel for 150 tones. In the matrix of FIG. 4D, the first and fourth pixels are alternately filled in the subdivided units, and when they are all filled up, the second and third pixels are alternately filled in the subdivided units.

Returning to Table 5, 03H to 06H represent the upper limits of the divisional number of pulse width modulation (PWM) of the pixels, and 07H to 0A11 represent the lower limits thereof. The PWM divisional number represents steps corresponding to the thickness of the laser beam of the printer unit, i.e. the number of widths of a pulse (this pulse is a PWM signal) which drives the semiconductor laser of the printer unit. With respect to the maximum value thereof, specifically, with reference to the example of FIGS. 4A, the upper limit of the first pixel is 63, the upper limit of the second pixel is 127, the upper limit of the third pixel is 255, and the upper limit of the fourth pixel is 191. Likewise, the lower limits of the first, second, third and fourth pixels are 0, 64, 191 and 128, respectively. In Table 5, 0BH to 0EH represent the orders of increase of the pixels.

Figure 3:
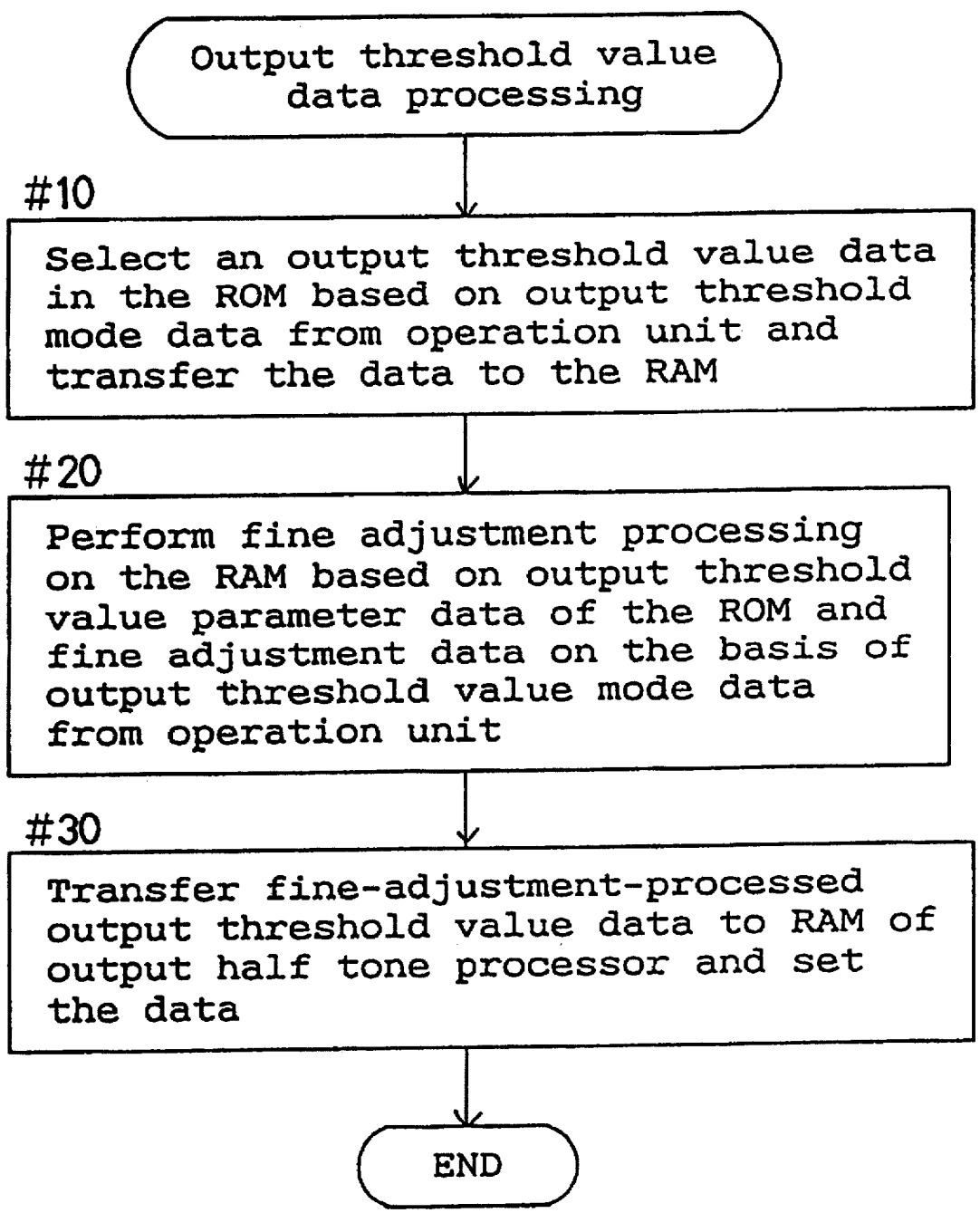
FIG. 3 is a flowchart of an example of an operation of the copying machine of FIG. 2.

Subsequently, an operation to perform image processing by using the parameters in the data ROM 9 will be described with reference to the flowchart of FIG. 3. When the program of the output threshold value data processing is activated, at step #10, the CPU 8 of the image processing unit 5 selects an output threshold value data in the data ROM 9 based on an output threshold value mode data (in this case, output threshold value mode 10) from the operation unit 3 and transfers the selected data to the work RAM.

Then, at step #20, a fine adjustment processing is performed on the work RAM 11. At this time, the processing is performed based on an output threshold value parameter data of the data ROM 9 and a fine adjustment data transmitted from the operation unit 3 on the basis of the threshold value mode data from the operation unit 3. The fine-adjustment-processed output threshold value data is transferred to the RAM 13 of the output half tone processor 12 and set (step #30).

Figure 6:
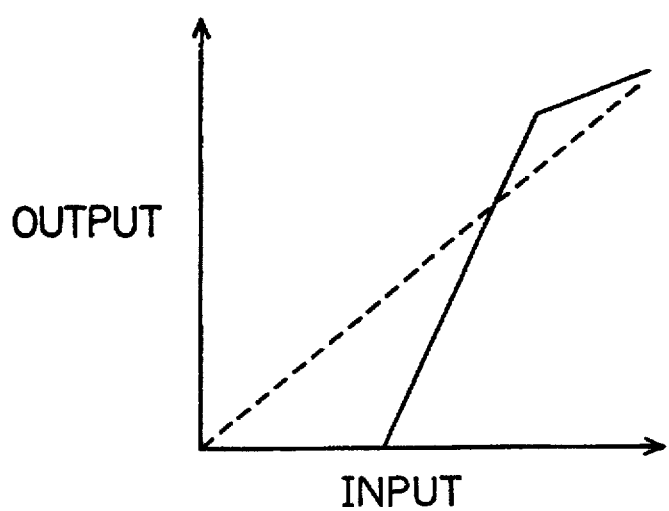
FIG. 6 shows a case where a correction is made to the characteristic of FIG. 5.

When the input characteristic of the machine is the above-described one shown in FIG. 5, to make a correction as shown in FIG. 6, it is necessary to set a data (threshold value) corresponding to the address 260 to the address 250 of the RAM of the output half tone processor 12 as described with reference to the prior art, and the data (threshold value) corresponding to the address 260 is calculated on the work RAM 11. In that case, since the rule parameters such as the way of increase of the matrix of the threshold value can be obtained from the data ROM 9, it is unnecessary to conjecture the rule, so that the data (threshold value) corresponding to the address 260 can be calculated with high accuracy for a short period of time.

The obtained data (threshold value) is set in the address 250 of the RAM 13 of the output half tone processor 12. The input image data S1 serves as an address data of the RAM 13, and a data of the RAM 13 corresponding to the address is outputted as an output image data $S_O$. The output image data $S_O$ is supplied to the printer unit 14.

As described above, according to the present invention, parameter data representative of the characteristics of image processing data are stored in a memory where the image processing data is stored, so that the setting of various data for processing input image data is easily and accurately performed. This is very advantageous.

Obviously, many modifications and variations of the present invention are possible in light of the above teachings. It is therefore to be understood that within the scope of the appended claims, the invention may be practiced other than as specifically described.

TABLE 1

| Blank | |
| Other data | |
| Filter data | Q mode |
| Font data | |
| Black generating data | P mode |

TABLE 1-continued

| | |
|---|---|
| Scanner data | M mode |
| Output threshold value data | N mode |

TABLE 2

| | |
|---|---|
| Blank | |
| Other data | |
| Filter data | Q mode |
| Font data | |

TABLE 2-continued

| | |
|---|---|
| Black generating data | P mode |
| Scanner data | M mode |
| Output threshold value data parameter | N mode |
| Output threshold value data | N mode |

TABLE 3

Mapping in Output Threshold Value Data Area

| 18000H | 0H | 400H | 800H | C00H | 15 |
|---|---|---|---|---|---|
| 17000H | mod92(ht_md92) | mod93(ht_md93) | mod94(ht_md94) | mod95(ht_md95) | |
| 16000H | mod88(ht_md88) | mod89(ht_md89) | mod810(ht_md90) | mod91(ht_md91) | |
| 15000H | mod84(ht_md84) | mod85(ht_md85) | mod86(ht_md86) | mod87(ht_md87) | |
| 14000H | mod80(ht_md80) | mod81(ht_md81) | mod82(ht_md82) | mod83(ht_md83) | |
| 13000H | mod76(ht_md76) | mod77(ht_md77) | mod78(ht_md78) | mod79(ht_md79) | |
| 12000H | mod72(ht_md72) | mod73(ht_md73) | mod74(ht_md74) | mod75(ht_md75) | |
| 11000H | mod68(ht_md68) | mod69(ht_md69) | mod70(ht_md70) | mod71(ht_md71) | |
| 10000H | mod64(ht_md64) | mod65(ht_md65) | mod66(ht_md66) | mod67(ht_md67) | |
| 0F000H | mod60(ht_md60) | mod61(ht_md61) | mod62(ht_md62) | mod63(ht_md63) | |
| 0E000H | mod56(ht_md56) | mod57(ht_md57) | mod58(ht_md58) | mod59(ht_md59) | |
| 0D000H | mod52(ht_md52) | mod53(ht_md53) | mod54(ht_md54) | mod55(ht_md55) | |
| 0C000H | mod48(ht_md48) | mod49(ht_md49) | mod50(ht_md50) | mod51(ht_md51) | |
| 0B000H | mod44(ht_md44) | mod45(ht_md45) | mod46(ht_md46) | mod47(ht_md47) | |
| 0A000H | mod40(ht_md40) | mod41(ht_md41) | mod42(ht_md42) | mod43(ht_md43) | |
| 09000H | mod36(ht_md36) | mod37(ht_md37) | mod38(ht_md38) | mod39(ht_md39) | |
| 08000H | mod32(ht_md32) | mod33(ht_md33) | mod34(ht_md34) | mod35(ht_md35) | |
| 07000H | mod28(ht_md28) | mod29(ht_md29) | mod30(ht_md30) | mod31(ht_md31) | |
| 06000H | mod24(ht_md24) | mod25(ht_md25) | mod26(ht_md26) | mod27(ht_md27) | |
| 05000H | mod20(ht_md20) | mod21(ht_md21) | mod22(ht_md22) | mod23(ht_md23) | |
| 04000H | mod16(ht_md16) | mod17(ht_md17) | mod18(ht_md18) | mod19(ht_md19) | |
| 03000H | mod12(ht_md12) | mod13(ht_md13) | mod14(ht_md14) | mod15(ht_md15) | |
| 02000H | mod08(ht_md08) | mod09(ht_md09) | mod10(ht_md10) | mod11(ht_md11) | |
| 01000H | mod04(ht_md04) | mod05(ht_md05) | mod06(ht_md06) | mod07(ht_md07) | |
| 00000H | mod00(ht_md00) | mod01(ht_md01) | mod02(ht_md02) | mod03(ht_md03) | |

TABLE 4

Mapping in Output Threshold Value Data Area

| 00000H | 0H | 10H | 20H | 30H | 16 |
|---|---|---|---|---|---|
| 005C0H | mod92(ht_md92) | mod93(ht_md93) | mod94(ht_md94) | mod95(ht_md95) | |
| 00580H | mod88(ht_md88) | mod89(ht_md89) | mod810(ht_md90) | mod91(ht_md91) | |
| 00540H | mod84(ht_md84) | mod85(ht_md85) | mod86(ht_md86) | mod87(ht_md87) | |
| 00500H | mod80(ht_md80) | mod81(ht_md81) | mod82(ht_md82) | mod83(ht_md83) | |
| 004C0H | mod76(ht_md76) | mod77(ht_md77) | mod78(ht_md78) | mod79(ht_md79) | |
| 00480H | mod72(ht_md72) | mod73(ht_md73) | mod74(ht_md74) | mod75(ht_md75) | |
| 00440H | mod68(ht_md68) | mod69(ht_md69) | mod70(ht_md70) | mod71(ht_md71) | |
| 00400H | mod64(ht_md64) | mod65(ht_md65) | mod66(ht_md66) | mod67(ht_md67) | |
| 003C0H | mod60(ht_md60) | mod61(ht_md61) | mod62(ht_md62) | mod63(ht_md63) | |
| 00380H | mod56(ht_md56) | mod57(ht_md57) | mod58(ht_md58) | mod59(ht_md59) | |
| 00340H | mod52(ht_md52) | mod53(ht_md53) | mod54(ht_md54) | mod55(ht_md55) | |
| 00300H | mod48(ht_md48) | mod49(ht_md49) | mod50(ht_md50) | mod51(ht_md51) | |

TABLE 4-continued

Mapping in Output Threshold Value Data Area

|  | 0H | 10H | 20H | 30H | 16 |
|---|---|---|---|---|---|
| 00000H | | | | | |
| 002C0H | mod44(ht_md44) | mod45(ht_md45) | mod46(ht_md46) | mod47(ht_md47) | |
| 00280H | mod40(ht_md40) | mod41(ht_md41) | mod42(ht_md42) | mod43(ht_md43) | |
| 00240H | mod36(ht_md36) | mod37(ht_md37) | mod38(ht_md38) | mod39(ht_md39) | |
| 00200H | mod32(ht_md32) | mod33(ht_md33) | mod34(ht_md34) | mod35(ht_md35) | |
| 001C0H | mod28(ht_md28) | mod29(ht_md29) | mod30(ht_md30) | mod31(ht_md31) | |
| 00180H | mod24(ht_md24) | mod25(ht_md25) | mod26(ht_md26) | mod27(ht_md27) | |
| 00140H | mod20(ht_md20) | mod21(ht_md21) | mod22(ht_md22) | mod23(ht_md23) | |
| 00100H | mod16(ht_md16) | mod17(ht_md17) | mod18(ht_md18) | mod19(ht_md19) | |
| 000C0H | mod12(ht_md12) | mod13(ht_md13) | mod14(ht_md14) | mod15(ht_md15) | |
| 00080H | mod08(ht_md08) | mod09(ht_md09) | mod10(ht_md10) | mod11(ht_md11) | |
| 00040H | mod04(ht_md04) | mod05(ht_md05) | mod06(ht_md06) | mod07(ht_md07) | |
| 00000H | mod00(ht_md00) | mod01(ht_md01) | mod02(ht_md02) | mod03(ht_md03) | |

TABLE 5

Details of Output Threshold Value Data Parameter Data

| | |
|---|---|
| 10H | |
| 0FH | 4th pixel matrix increase order (dm[3]) [in the order of 0, 1, 2, 3] |
| 0EH | 3rd pixel matrix increase order (dm[2]) [in the order if 0, 1, 2, 3] |
| 0DH | 2nd pixel matrix increase order (dm[1]) [in the order of 0, 1, 2, 3] |
| 0CH | 1st pixel matrix increase order (dm[0]) [in the order of 0, 1, 2, 3] |
| 0BH | Lower limit of PWM divisional number of 4th pixel [pixel order](lc[3]) |
| 0AH | Lower limit of PWM divisional number of 3rd pixel [pixel order](lc[2]) |
| 09H | Lower limit of PWM divisional number of 2n4d pixel [pixel order](lc[1]) |
| 08H | Lower limit of PWM divisional number of 1st pixel [pixel order], or lower limit of PWM divisional number of all pixels [other order](lc[0]) |
| 07H | Upper limit of PWM divisional number of 4th pixel [pixel order](uc[3]) |
| 06H | Upper limit of PWM divisional number of 3rd pixel [pixel order](uc[2]) |
| 05H | Upper limit of PWM divisional number of 2nd pixel [pixel order](uc[1]) |
| 04H | Upper limit of PWM divisional number od 1st pixel [pixel order], or upper limit of PWM divisional number of all pixels [other order](uc[0]) |
| 03H | PWM divisional number (e.g. 256 tones: 0FFH divisional number = data+1) |
| 02H | Matrix size (bit0-3: vertical size, bit4-7: horizontal size) |
| 01H | Way of increase of matrix (0: matrix order, 1: pixel order, 2: cross order) |
| 00H | |

What is claimed is:

1. An image forming apparatus in which input image data are printed out after being processed by use of image processing data stored in a memory, wherein parameter data representative of a characteristic of the image processing data are also stored in the memory, and the input image data are processed with reference to the parameter data, said apparatus comprising:

a half tone processor including a random access memory for storing therein a threshold value for the input image data;

a work random access memory for performing a fine adjustment processing of the threshold value of the random access memory based on the parameter data; and controlling means for controlling the fine adjustment processing by the work random access memory and for setting a processed threshold value in the random access memory.

2. An image forming apparatus according to claim 1, wherein the random access memory outputs as output image data, data at an address corresponding to the input image data;

wherein said apparatus includes another memory in which data to-be-written in the random access memory are stored;

wherein the controlling means is capable of processing and changing the data to-be-written in the random access memory before the to-be-written data are written in the random access memory and, wherein parameter data representative of a characteristic of the to-be-written data stored in the said another memory are also stored in the said another memory, and wherein the controlling means processes the data to-be-written in the random access memory with reference to the parameter data.

3. An image forming apparatus according to claim 2, wherein the parameter data are representative of a way of increase of data in a multi-value dither matrix.

4. An image forming apparatus according to claim 1, wherein said parameter data are representative of a way of increase of data in a multi-value dither matrix.

5. An image forming apparatus according to claim 1, wherein said parameter data are representative of a way of increase of data in a multi-value dither matrix.

* * * * *